(12) United States Patent
Bao et al.

(10) Patent No.: US 11,199,423 B2
(45) Date of Patent: Dec. 14, 2021

(54) GEARSHIFT DEVICE AND GEAR CODING METHOD

(71) Applicants: KOSTAL (SHANGHAI) MANAGEMENT CO., LTD., Shanghai (CN); SHANGHAI KOSTAL-HUAYANG AUTOMOTIVE ELECTRIC CO., LTD., Shanghai (CN)

(72) Inventors: Yueyue Bao, Shanghai (CN); Hu Zhou, Shanghai (CN)

(73) Assignees: KOSTAL (SHANGHAI) MANAGEMENT CO., LTD., Shanghai (CN); SHANGHAI KOSTAL-HUAYANG AUTOMOTIVE ELECTRIC CO., LTD., Shanghai (CN)

( * ) Notice: Subject to any disclaimer, the term of this patent is extended or adjusted under 35 U.S.C. 154(b) by 0 days.

(21) Appl. No.: 16/760,395

(22) PCT Filed: Dec. 26, 2017

(86) PCT No.: PCT/CN2017/118508
§ 371 (c)(1),
(2) Date: Apr. 29, 2020

(87) PCT Pub. No.: WO2019/085230
PCT Pub. Date: May 9, 2019

(65) Prior Publication Data
US 2020/0355520 A1  Nov. 12, 2020

(30) Foreign Application Priority Data
Oct. 31, 2017  (CN) .......................... 201711045506.4

(51) Int. Cl.
*G01D 5/14* (2006.01)
*F16H 63/42* (2006.01)

(52) U.S. Cl.
CPC ............. *G01D 5/145* (2013.01); *F16H 63/42* (2013.01)

(58) Field of Classification Search
CPC ............................... G01D 5/145; F16H 63/42
See application file for complete search history.

(56) References Cited

U.S. PATENT DOCUMENTS

| | | | |
|---|---|---|---|
| 6,469,642 B1 | 10/2002 | Kreppold | |
| 2004/0035237 A1* | 2/2004 | Matsui | F16H 59/105 74/473.12 |
| 2018/0038477 A1 | 2/2018 | Pfeifer | |

FOREIGN PATENT DOCUMENTS

| | | |
|---|---|---|
| CN | 2134310 Y | 5/1993 |
| CN | 102087507 A | 6/2011 |
| | (Continued) | |

OTHER PUBLICATIONS

International Search Report for PCT/CN2017/118508 dated Jul. 24, 2018, ISA/CN.
(Continued)

*Primary Examiner* — Clayton E. LaBalle
*Assistant Examiner* — Michael A Harrison
(74) *Attorney, Agent, or Firm* — Yue (Robert) Xu; Apex Attorneys at Law, LLP

(57) ABSTRACT

A gearshift device is provided. The gearshift device includes a magnetic plate and sensors for sensing the magnetic plate to output a gear signal. The magnetic plate includes M coding regions for distinguishing M gears, and at least two coding regions of the M coding regions share a same region of the magnetic plate. M is a positive integer greater than or equal to 2.

9 Claims, 9 Drawing Sheets

(56) References Cited

FOREIGN PATENT DOCUMENTS

| | | |
|---|---|---|
| CN | 102099603 A | 6/2011 |
| CN | 203698169 U | 7/2014 |
| CN | 106353090 A | 1/2017 |
| CN | 107101656 A | 8/2017 |
| DE | 102015203752 A1 | 9/2016 |
| EP | 2348233 A1 | 7/2011 |
| GB | 1370199 A | 10/1974 |
| JP | 2000148352 A | 5/2000 |

OTHER PUBLICATIONS

CNIPA First Office Action corresponding to Application No. 201711045506.4; Issued Mar. 22, 2019.
First Office Action dated Mar. 2, 2021 for Japanese patent application No. 2020-543664, English translation provided by Global Dossier.

* cited by examiner

GEARSHIFT DEVICE AND GEAR CODING METHOD

The present application is a National phase application of PCT international application PCT/CN2017/118508, filed on Dec. 26, 2017 which claims priority to Chinese Patent Application No. 201711045506.4, titled "GEARSHIFT DEVICE AND GEAR CODING METHOD", filed on Oct. 31, 2017 with the China National Intellectual Property Administration, both of which are incorporated herein by reference in their entireties.

TECHNICAL FIELD

The present disclosure relates to the technical field of automobiles, and in particular to a gearshift device and a gear coding method.

BACKGROUND

With the continuous development of automobile technology, wire-controlled gearshift devices have gradually replaced conventional mechanical gearshift devices.

The wire-controlled gearshift device includes a magnetic plate and sensors for sensing the magnetic plate. The magnetic plate includes multiple coding regions, and the sensors sense different coding regions and output different gear signals to determine a gear set by the user.

In the conventional technology, for different gears, the sensors correspond to different positions in the magnetic plate, that is, coding regions of different gears correspond to different regions of the magnetic plate. With reference to FIG. 1 and FIG. 2, FIG. 1a is a schematic diagram showing a position of sensors of a gearshift device relative to a magnetic plate when the sensors sense a coding region corresponding to a first gear according to the conventional technology, and FIG. 1b is a schematic diagram showing a position of the sensors of the gearshift device in FIG. 1a relative to the magnetic plate when the sensors sense a coding region corresponding to a second gear. For example, if the sensors 11 are classified into two groups, one group of the sensors 11 are represented by one column of the magnetic plate 10, and each group includes four sensors 11 corresponding to four rows in FIG. 1. At the first gear, the sensors 11 sense a coding region 12 of the magnetic plate 10; at the second gear, the sensors sense a coding region 13 of the magnetic plate 10, and so on. If an automobile has total 5 gears, the magnetic plate includes 5 coding regions, and the magnetic plate 10 includes at least 10 columns, thus the size of the magnetic plate 10 tends to be large. For automobiles having more gears, this defect is more obvious and is in contradiction with the development requirements of the increasingly small wire-controlled gearshift devices.

Therefore, how to reduce the size of the magnetic plate becomes a problem required to be solved by those skilled in the art at present.

SUMMARY

A gearshift device and a gear coding method are provided according to the present disclosure to reduce the size of the magnetic plate.

In order to solve the above technical problems, a gearshift device is provided according to the present disclosure. The gearshift device includes a magnetic plate and sensors for sensing the magnetic plate to output a gear signal. The magnetic plate includes M coding regions for distinguishing M gears, and at least two coding regions of the M coding regions share a same region of the magnetic plate. M is a positive integer greater than or equal to 2.

Preferably, for any one of the coding regions, at least one remaining coding region shares the same region of the magnetic plate with the coding region.

Preferably, the magnetic plate is divided into N columns, and each of the coding regions includes K columns. The sensors are classified into K groups, and each group includes at least one sensor. Each group of the sensors sense one column of the coding region corresponding to the sensors. The total number of columns of the magnetic plate shared by the coding regions is N−2. N is a positive integer greater than or equal to 3, K is a positive integer greater than or equal to 2 and less than N, and the same region includes at least one column.

Preferably, the K is 2, and the M is 5.

Preferably, the M is 5, the magnetic plate is divided into 7 columns, and each of the coding regions includes 2 columns. The sensors are classified into 2 groups, and each group includes at least one sensor. Each group of the sensors sense one column of the coding region corresponding to the sensors. The total number of columns of the magnetic plate shared by the coding regions is 3.

Preferably, the M is 5, the magnetic plate is divided into 8 columns, and each of the coding regions includes 2 columns. The sensors are classified into 2 groups, and each group includes at least one sensor. Each group of the sensors sense one column of the coding region corresponding to the sensors. The total number of columns of the magnetic plate shared by the coding regions is 2.

Preferably, the M is 5, the magnetic plate is divided into 9 columns, and each of the coding regions includes 2 columns. The sensors are classified into 2 groups, and each group includes at least one sensor. Each group of the sensors sense one column of the coding region corresponding to the sensors. The total number of columns of the magnetic plate shared by the coding regions is 1.

Preferably, the numbers of the sensors in different groups is equal.

Preferably, the sensors are Hall sensors.

A gear coding method, performed by the shift device described above, is provided according to the present disclosure. The method includes:

providing a coding region corresponding to each gear on the magnetic plate; and performing coding for each gear in response to an output signal of sensors when the sensors sense each coding region, where for different gears, codes corresponding to the output signals of the sensors when the sensors sense same regions of the magnetic plate shared by the coding regions are equal.

The gearshift device according to the present disclosure includes a magnetic plate and sensors for sensing the magnetic plate to output a gear signal. The magnetic plate includes M coding regions for distinguishing M gears, and at least two coding regions of the M coding regions share a same region of the magnetic plate. M is a positive integer greater than or equal to 2. It can be seen that coding regions corresponding to at least two gears share the same region of the magnetic plate. Compared with the conventional technology in which the coding regions of the gears correspond to different regions of the magnetic plate, the size of the magnetic plate is reduced with the solution according to the present disclosure. The gear coding method according to the present disclosure can achieve the same effect as above.

BRIEF DESCRIPTION OF THE DRAWINGS

The drawings to be used in the embodiments are described briefly as follows, so that the embodiments of the present disclosure become clearer. It is apparent that the drawings in the following description show only some embodiments of the present disclosure. For those skilled in the art, other drawings may be obtained according to these drawings without any creative work.

DETAILED DESCRIPTION

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the protection scope of the present disclosure.

A gearshift device and a gear coding method are provided according to the present disclosure to reduce the size of the magnetic plate.

Hereinafter, the present disclosure is explained in further detail in conjunction with the drawings and specific embodiments to enable those skilled in the art to better understand the technical solutions in the present disclosure.

Figure 1A:
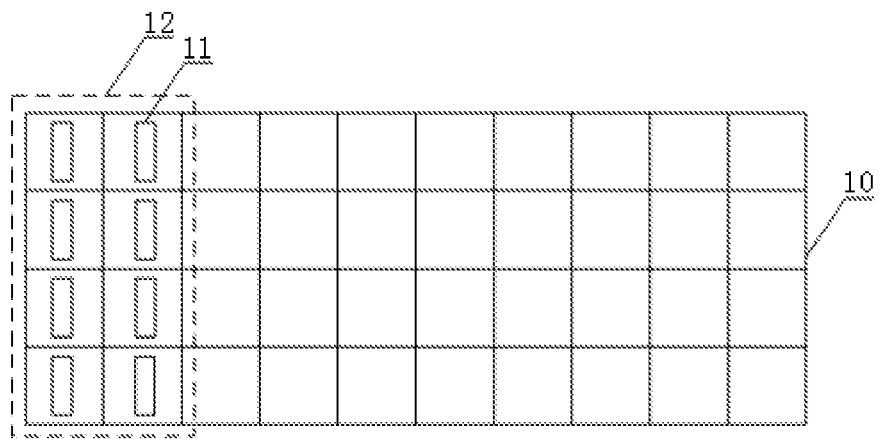
FIG. 1a is a schematic diagram showing a position of sensors of a gearshift device relative to a magnetic plate when the sensors sense a coding region corresponding to a first gear according to the conventional technology.
Figure 1B:
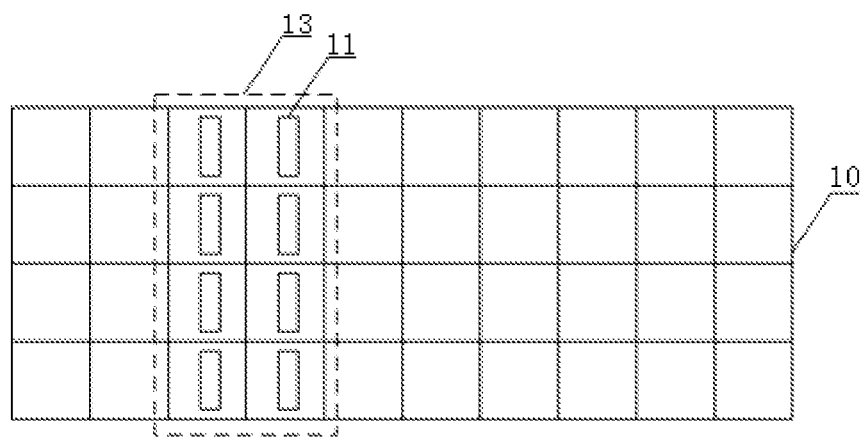
FIG. 1b is a schematic diagram showing a position of the sensors of the gearshift device in FIG. 1a relative to the magnetic plate when the sensors sense a coding region corresponding to a second gear.
Figure 2:
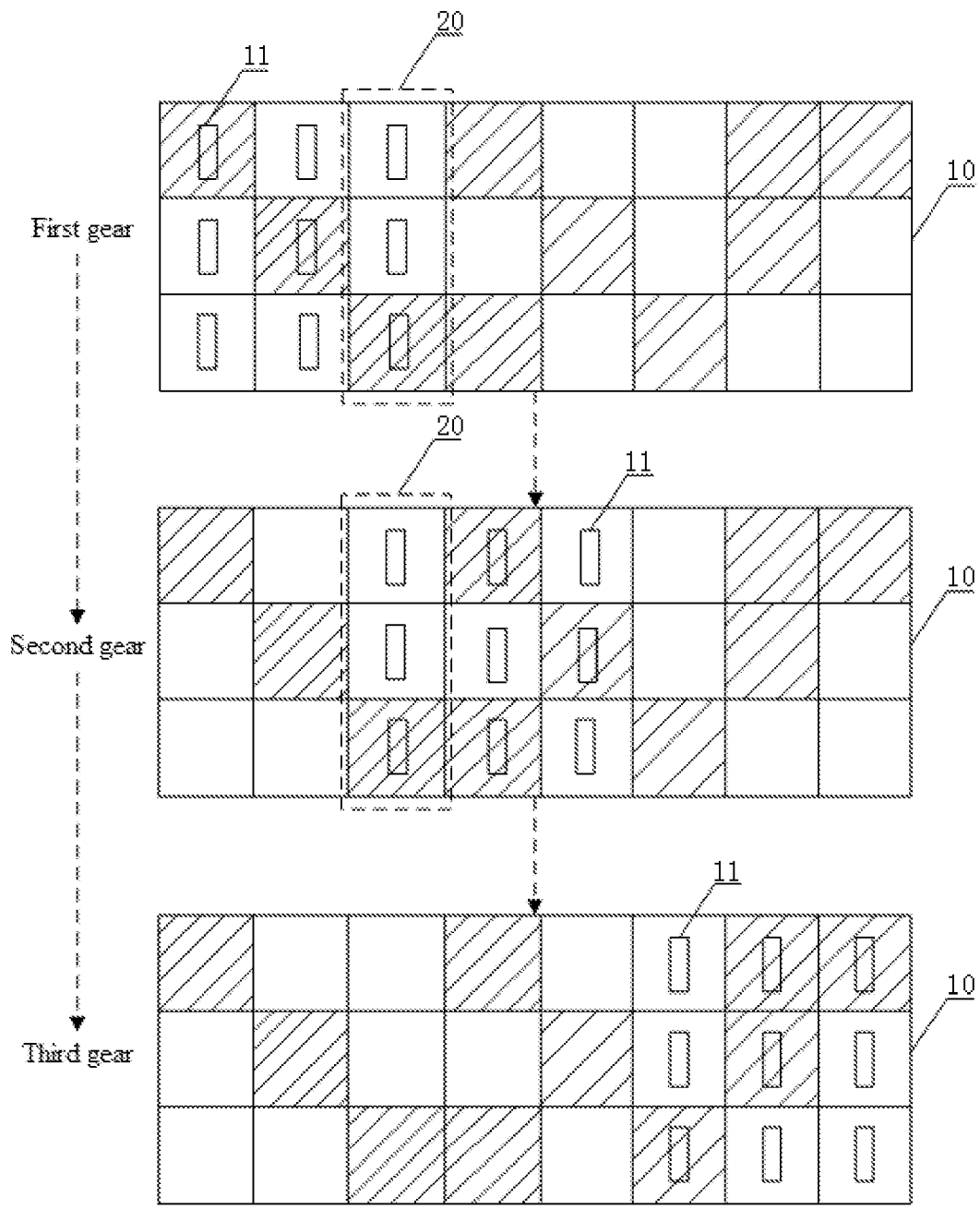
FIG. 2 is a schematic diagram showing a position of sensors of a gearshift device relative to a magnetic plate when the sensors sense coding regions corresponding to respective gears according to an embodiment of the present disclosure.

FIG. 2 is a schematic diagram showing a position of sensors of a gearshift device relative to a magnetic plate when the sensors sense coding regions corresponding to respective gears according to an embodiment of the present disclosure. The gearshift device includes a magnetic plate 10 and sensors 11 for sensing the magnetic plate 10 to output a gear signal. The magnetic plate 10 includes M coding regions for distinguishing M gears, and at least two coding regions of the M coding regions share a same region of the magnetic plate 10. M is a positive integer greater than or equal to 2.

With reference to FIG. 2, a coding region corresponding to a first gear and a coding region corresponding to a second gear share a same region 20 of a magnetic plate 10.

When the sensors 11 sense the magnetic plate 10, the sensors 11 output different values in different coding regions, thereby performing different gear coding. At least two coding regions of the multiple coding regions share a same region of the magnetic plate 10. The sensors 11 output same signals when the sensors sense the same regions of the magnetic plate 10 shared by the coding regions, thereby performing the same gear coding. Since at least two coding regions share the same region of the magnetic plate 10, the number of the coding regions is at least two, indicating that the number of the gears is at least two. Therefore, M is a positive integer greater than or equal to 2.

It should be noted that FIG. 2 shows a case that among three coding regions corresponding to three gears, the coding region corresponding to the first gear and the coding region corresponding to the second gear share the same region 20 of the magnetic plate 10. Alternatively, the coding region corresponding to the first gear may share a same region of the magnetic plate 10 with a coding region corresponding to a third gear, or the coding region corresponding to the second gear may share a same region of the magnetic plate 10 with the coding region corresponding to the third gear, as long as at least two coding regions share a same region of the magnetic plate 10. The number of the coding regions sharing a same region of the magnetic plate 10 is not limited in the present disclosure, and two specific gears whose coding regions share the same region of the magnetic plate 10 are not limited in the present disclosure.

In addition, it should be noted that, according to the embodiment, as shown in FIG. 2, the gearshift device has total three gears, and the position of the sensors 11 relative to the magnetic plate 10 when the sensors 11 of the gearshift device sense coding regions corresponding to respective gears is described. However, the gearshift device is unnecessary to include only three gears, and the gearshift device may have other numbers of gears, as long as at least two coding regions corresponding to the gears share a same region of the magnetic plate 10.

It should be noted that although the sensors 11 of the gearshift device shown in FIG. 2 are evenly distributed and the sensors 11 are arranged in a form of three rows and three columns, the sensors 11 are unnecessary to be arranged in the form shown in FIG. 2. The sensors 11 may be unevenly distributed, and the sensors 11 are unnecessary to be arranged into three rows or three columns, as long as at least two coding regions corresponding to the gears share a same region of the magnetic plate 10. Correspondingly, at least two gears share a same position relative to the magnetic plate 10 when the sensors 11 sense the coding regions corresponding to the gears.

It should be noted that, as shown in FIG. 2, the coding region corresponding to the first gear and the coding region corresponding to the second gear share the same region 20 of the magnetic plate 10, and the same region 20 of the magnetic plate 10 shared by the two coding regions covers one column of the sensors 11 when the sensors 11 sense the two coding regions. However, a size of the same region of the magnetic plate 10 shared by the two coding regions is unnecessary to be equal to the size of the same region 20 shown in FIG. 2, and the same region of the magnetic plate 10 shared by the coding regions is unnecessary to cover one column of the sensors 11 when the sensors 11 sense the two coding regions.

It should be noted that, although the magnetic plate 10 in the gearshift device presents in a form of columns and rows according to the embodiment, the magnetic plate 10 is unnecessary to present in the form of columns or rows. As shown in FIG. 2, shaded regions and non-shaded regions represent two types of regions having different magnetic field strengths. The sensors 11 output different values when the sensors sense the shaded regions and the non-shaded regions of the magnetic plate 10, so that the sensors 11 output different signals in different coding regions to distinguish different gears. However, the shadow regions and the non-shadow regions are unnecessary to be distributed in the form shown in FIG. 2, as long as the gears can be distinguished based on cooperation of the distribution of the regions and the sensors 11. The specific distribution of the shadow regions and the non-shadow regions is not limited in the present disclosure.

The gearshift device according to the embodiment includes a magnetic plate and sensors for sensing the magnetic plate to output a gear signal. The magnetic plate includes M coding regions for distinguishing M gears, and at least two coding regions of the M coding regions share a same region of the magnetic plate. M is a positive integer greater than or equal to 2. It can be seen that coding regions corresponding to at least two gears share the same region of the magnetic plate. Compared with a case in which the coding regions of different gears correspond to different regions of the magnetic plate, the size of the magnetic plate is reduced according to the solution of the present disclosure.

Figure 3:
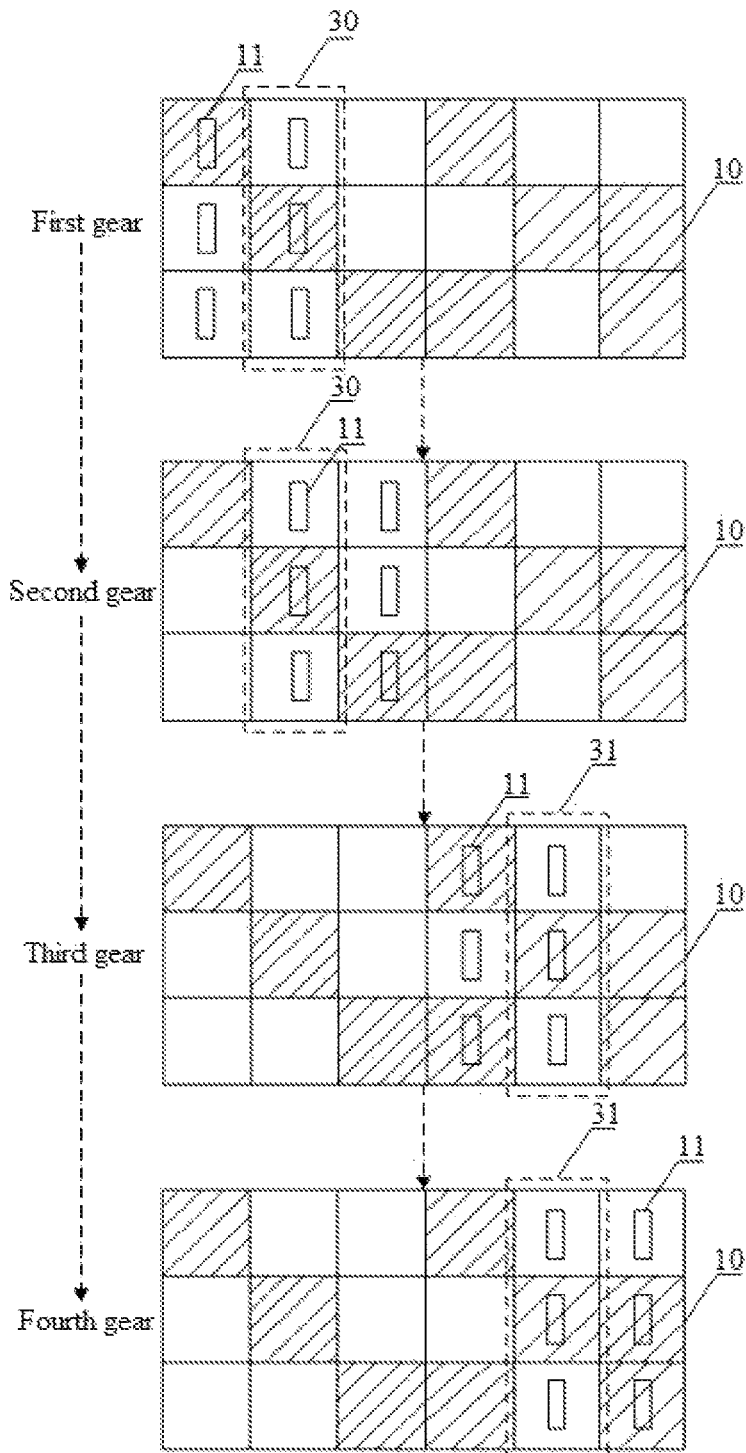
FIG. 3 is a schematic diagram showing a position of sensors of a gearshift device relative to a magnetic plate when the sensors sense coding regions corresponding to respective gears according to another embodiment of the present disclosure.

FIG. 3 is a schematic diagram showing a position of sensors of a gearshift device relative to a magnetic plate when the sensors sense coding regions corresponding to respective gears according to another embodiment of the present disclosure.

Based on the above embodiments, in order to further reduce the size of the magnetic plate 10, as a preferred embodiment, for any one of the coding regions, at least one remaining coding region shares the same region of the magnetic plate 10 with the coding region.

With reference to FIG. 3, for a coding region corresponding to a first gear, a coding region corresponding to a second gear shares a same region 30 of the magnetic plate 10 with the coding region corresponding to the first gear. For the coding region corresponding to the second gear, the coding region corresponding to the first gear shares the same region 30 of the magnetic plate 10 with the coding region corresponding to the second gear. For a coding region corresponding to a third gear, a coding region corresponding to a fourth gear shares a same region 31 of the magnetic plate 10 with the coding region corresponding to the third gear. For the coding region corresponding to the fourth gear, the coding region corresponding to the third gear shares the same region 31 of the magnetic plate 10 with the coding region corresponding to the fourth gear.

It should be noted that, for a coding region corresponding to each gear shown in FIG. 3, one remaining coding region shares a same region of the magnetic plate 10 with the coding region. However, the coding region corresponding to each gear is unnecessary to share only one same region of the magnetic plate 10 with a coding region corresponding to one gear. For example, for the coding region corresponding to the second gear, the coding region corresponding to the first gear shares the same region 30 of the magnetic plate 10 with the coding region corresponding to the second gear. Based on this, the coding region corresponding to the second gear may share another same region of the magnetic plate 10 with the coding region corresponding to the third gear, which also falls within the scope of protection of the present disclosure. In addition, it is not limited in the present disclosure that a coding region corresponding to a gear shares a same region of the magnetic plate 10 with a coding region corresponding to which remaining gear. Base on the above embodiments, the gearshift device according to the embodiment only needs to satisfy that, for a coding region corresponding to any gear, at least one remaining coding region shares a same region of the magnetic plate 10 with the coding region.

It should be noted that, as shown in FIG. 3, the gearshift device has total four gears, and the position of the sensors 11 relative to the magnetic plate 10 when the sensors 11 of the gearshift device sense coding regions corresponding to respective gears is described. However, the gearshift device is unnecessary to have four gears and the gearshift device may have other numbers of gears, as long as for any coding region, at least one remaining coding region shares a same region of the magnetic plate 10 with the coding region.

It should be noted that although the sensors 11 of the gearshift device shown in FIG. 3 are evenly distributed and the sensors 11 are arranged in a form of three rows and two columns, the sensors 11 are unnecessary to be arranged in the form shown in FIG. 3. The sensors 11 may be unevenly distributed, and the sensors 11 are unnecessary to be arranged in three rows or two columns, as long as for any coding region, at least one remaining coding region shares a same region of the magnetic plate 10 with the coding region. Correspondingly, for any gear, at least one target gear corresponds to the gear; and the sensors 11 share a same position relative to the magnetic plate 10 when the sensors 11 sense the gear and the corresponding target gear.

It should be noted that as shown in FIG. 3, the coding region corresponding to the first gear and the coding region corresponding to the second gear share the same region 30 of the magnetic plate 10; the coding region corresponding to the third gear and the coding region corresponding to the fourth gear share the same region 31 of the magnetic plate 10; and when the sensors 11 sense the coding regions, the same region 30 covers one column of the sensors 11, and the same region 31 covers one column of the sensors 11. However, a size of the same region of the magnetic plate 10 shared by the coding regions is unnecessary to be equal to the size of the same region 30 or the same region 31 shown in the FIG. 3, and the same region 30 or the same region 31 is unnecessary to cover one column of the sensors 11 when the sensors 11 sense the four coding regions. In addition, the size of the same region 30 is unnecessary to be equal to the size of the same region 31, and the number of the sensors 11 corresponding to the same region 30 is unnecessary to be equal to the number of the sensors 11 corresponding to the same region 31.

It should be noted that, although the magnetic plate 10 in the gearshift device presents in a form of columns and rows according to the embodiment, the magnetic plate 10 is unnecessary to present in the form of columns or rows. As shown in FIG. 3, shaded regions and non-shaded regions represent two types of regions having different magnetic field strengths. The sensors 11 output different values when the sensors sense the shaded regions and the non-shaded regions of the magnetic plate 10, so that the sensors 11 output different signals in different coding regions to distinguish different gears. However, the shadow regions and the non-shadow regions are unnecessary to be distributed in the form shown in FIG. 3, as long as the gears can be distinguished based on cooperation of the distribution of the regions and the sensors 11. The specific distribution of the shadow regions and the non-shadow regions is not limited in the present disclosure.

Figure 4:
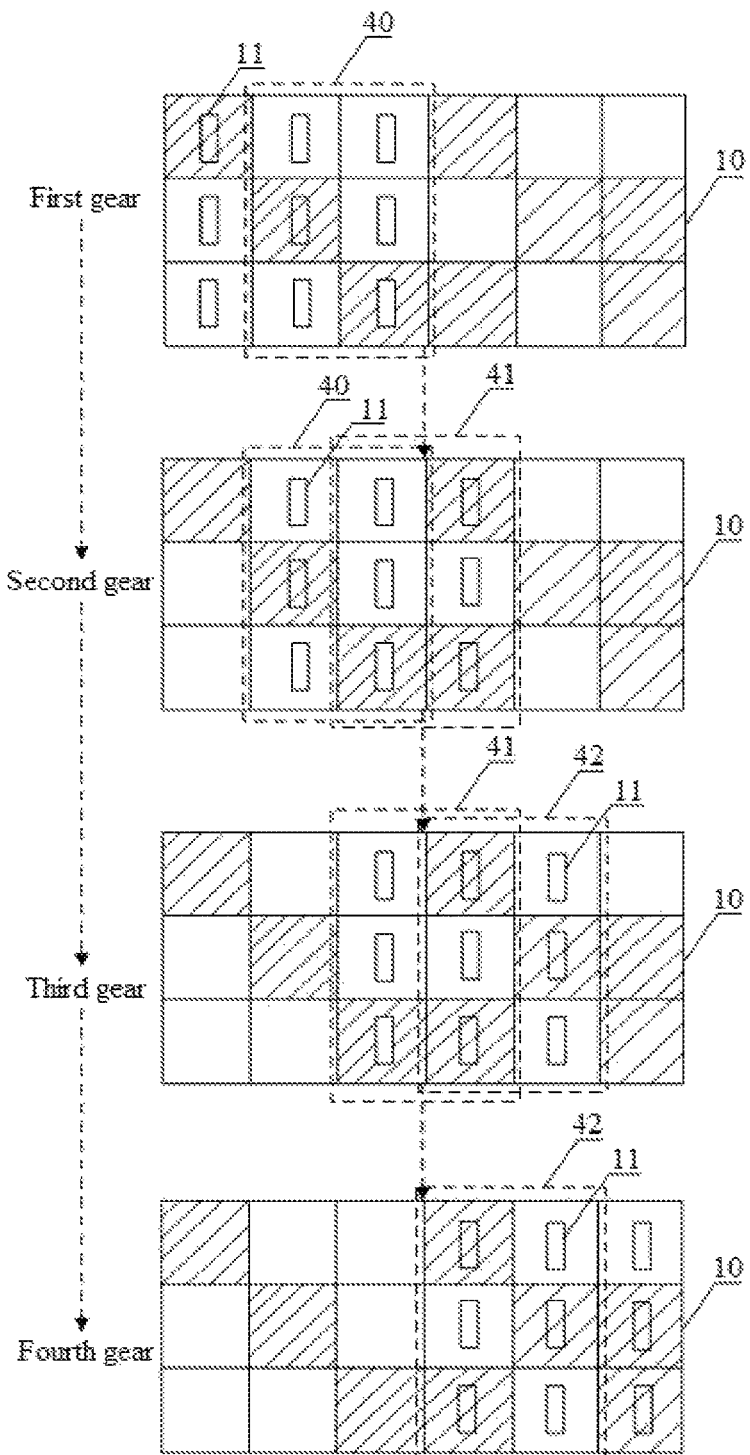
FIG. 4 is a schematic diagram showing a position of sensors of a gearshift device relative to a magnetic plate when the sensors sense coding regions corresponding to respective gears according to another embodiment of the present disclosure.

FIG. 4 is a schematic diagram showing a position of sensors of a gearshift device relative to a magnetic plate when the sensors sense coding regions corresponding to respective gears according to another embodiment of the present disclosure.

Based on the above embodiments, in order to further reduce the size of the magnetic plate 10, the magnetic plate 10 is divided into N columns, and each of the coding regions includes K columns. The sensors 11 are classified into K groups, each group includes at least one sensor 11, and each group of the sensors 11 sense one column of the coding region corresponding to the sensors. The total number of columns of the magnetic plate 10 shared by the coding regions is N−2. N is a positive integer greater than or equal to 3, K is a positive integer greater than or equal to 2 and less than N, and the same region includes at least one column.

The magnetic plate 10 is divided into N columns, and each of the coding regions includes K columns. The sensors are classified into K groups. When the sensors 11 sense a coding region, one group of the sensors 11 sense one column of the coding region. The total number of columns of the magnetic plate 10 shared by all the coding regions is N−2.

With reference to FIG. 4, in the gearshift device according to the embodiment, the magnetic plate 10 is divided into 6 columns, each of the coding regions includes 3 columns, and the sensors 11 are classified into 3 groups. A coding region corresponding to a first gear and a coding region corresponding to a second gear share a same region 40 of a magnetic plate 10, and the same region 40 covers a second column and a third column of the magnetic plate 10. The coding region corresponding to the second gear and a coding region corresponding to a third gear share a same region 41 of the magnetic plate 10, and the same region 41 covers the third column and a fourth column of the magnetic plate 10. The coding region corresponding to the third gear and a coding region corresponding to a fourth gear share a same region 42 of the magnetic plate 10, and the same region 42 covers the fourth column and a fifth column of the magnetic plate 10. Only a first column and a sixth column of the magnetic plate 10 are not shared by coding regions corresponding to any two gears. For the magnetic plate 10, the total number of columns of the magnetic plate 10 shared by the coding regions is four.

It should be noted that as shown in FIG. 4, the gearshift device has total four gears, and the position of the sensors 11 relative to the magnetic plate 10 when the sensors 11 of the gearshift device sense coding regions corresponding to respective gears is described. However, the gearshift device is unnecessary to have four gears. The gearshift device may have other numbers of gears. The number of gears of the gearshift device is not limited in the present disclosure.

It should be noted that in the gearshift device shown in FIG. 4, each of the coding regions includes 3 columns, the sensors 11 are classified into 3 groups, and each group includes three sensors 11 corresponding to three rows in FIG. 4. However, the sensors 11 are unnecessary to be divided into 3 groups, each of the coding regions is unnecessary to include 3 columns, and the number of sensors 11 in each group is unnecessary to be 3. The number of columns of each of the coding regions, the number of groups of the sensors 11, and the number of the sensors 11 in each group are not limited in the present disclosure.

It should be noted that although the same region 40, the same region 41, and the same region 42 shown in FIG. 4 all cover two columns of the magnetic plate 10, a same region is unnecessary to cover two columns of the magnetic plate 10. If the number of the columns of each of the coding regions is other values or the number of the groups of the sensors is other values, the number of the columns of the magnetic plate 10 covered by a same area may also be other values. It should be noted that, based on the above embodiments, the size of the magnetic plate can be minimized in a case that all the same regions have the same size, which is optimal. However, all the same regions are unnecessary to have the same size, that is, all the same regions cover the same number of columns of the magnetic plate 10, which is not limited in the present disclosure.

It should be noted that, shaded regions and non-shaded regions shown in FIG. 4 represent two types of regions having different magnetic field strengths of the magnetic plate. The sensors 11 output different values when the sensors sense the shaded regions and the non-shaded regions of the magnetic plate 10, so that the sensors 11 output different signals in different coding regions to distinguish different gears. However, the shadow regions and the non-shadow regions are unnecessary to be distributed in the form shown in FIG. 4, as long as the gears can be distinguished based on cooperation of the distribution of the regions and the sensors 11. The specific distribution of the shadow regions and the non-shadow regions is not limited in the present disclosure.

Figure 5:
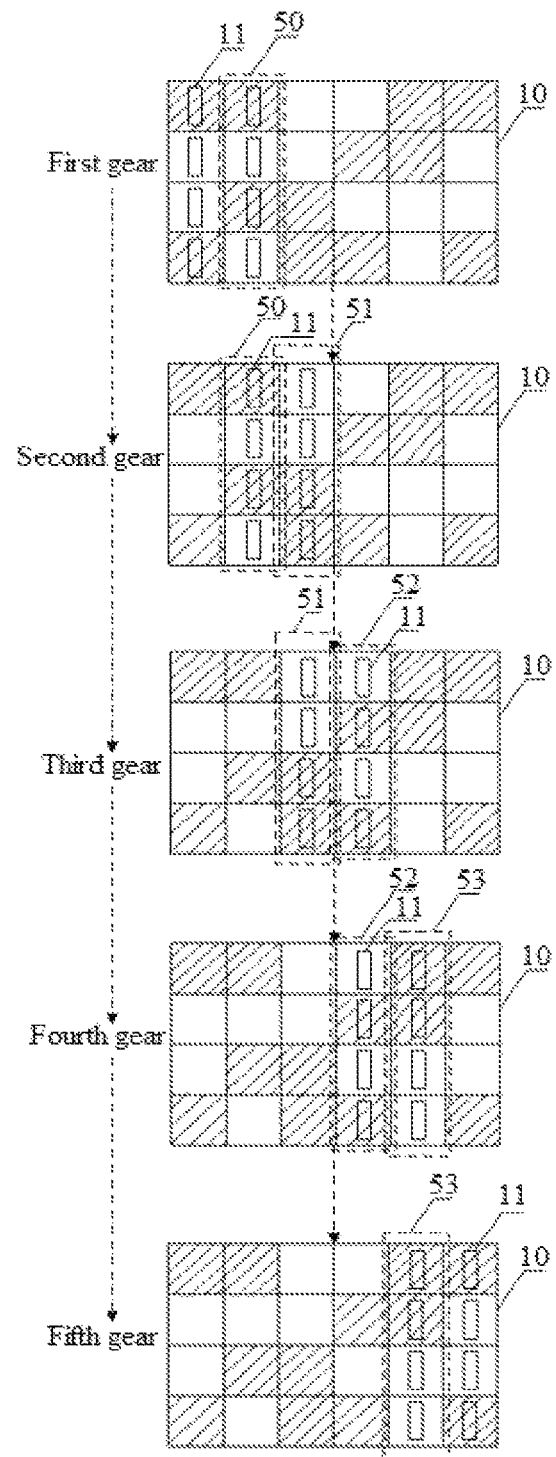
FIG. 5 is a schematic diagram showing a position of sensors of a gearshift device relative to a magnetic plate when the sensors sense coding regions corresponding to respective gears according to another embodiment of the present disclosure.

FIG. 5 is a schematic diagram showing a position of sensors of a gearshift device relative to a magnetic plate when the sensors sense coding regions corresponding to respective gears according to another embodiment of the present disclosure.

Based on the above embodiments, since the number of gears in an automobile usually is 5, as a preferred embodiment, K is 2, and M is 5.

Each of the coding regions includes 2 columns. The sensors 11 are classified into 2 groups, each group includes at least one sensor 11, and each group of the sensors 11 sense one column of the coding region corresponding to the sensors. Since the number of gears is 5, that is, the total number of the coding regions is 5, and the total number of columns of the magnetic plate 10 shared by all the coding regions is N−2, it can be concluded that the magnetic plate 10 is divided into 6 columns, and the total number of columns of the magnetic plate 10 shared by the coding regions is 4. Since the sensors 11 are classified into two groups and sense two columns of the coding region, any one of the same regions covers one column of the magnetic plate 10.

With reference to FIG. 5, each of the coding regions includes two columns, the sensors 11 are classified into two groups, and the gearshift device has a total of 5 coding regions. A coding region corresponding to a first gear and a coding region corresponding to a second gear share a same region 50 of the magnetic plate 10, and the same region 50 covers a second column of the magnetic plate 10. The coding region corresponding to the second gear and a coding region corresponding to a third gear share a same region 51 of the magnetic plate 10, and the same region 51 covers a third column of the magnetic plate 10. The coding region corresponding to the third gear and a coding region corresponding to a fourth gear share a same region 52 of the magnetic plate 10, and the same region 52 covers a fourth column of the magnetic plate 10. The coding region corresponding to the fourth gear and a coding region corresponding to a fifth gear share a same region 53 of the magnetic plate 10, and the same region 53 covers a fifth column of the magnetic plate 10. Only a first column and a sixth column of the magnetic plate 10 are not shared by the coding regions.

It should be noted that, as shown in FIG. 5, although the number of the sensors 11 in each group is 4 corresponding to 4 rows shown in FIG. 5, the number of the sensors 11 in each group is unnecessary to be 4, and the numbers of the sensors 11 in different groups are unnecessary to be equal. The number of the sensors 11 in each group and whether the numbers of the sensors 11 in different groups being equal are not limited in the present disclosure.

It should be noted that, shaded regions and non-shaded regions shown in FIG. 5 represent two types of regions having different magnetic field strengths of the magnetic plate. The sensors 11 output different values when the sensors sense the shaded regions and the non-shaded regions of the magnetic plate 10, so that the sensors 11 output different signals in different coding regions to distinguish different gears. However, the shadow regions and the non-shadow regions are unnecessary to be distributed in the form shown in FIG. 5, as long as the gears can be distinguished based on cooperation of the distribution of the regions and the sensors 11. The specific distribution of the shadow regions and the non-shadow regions is not limited in the present disclosure.

Figure 6:
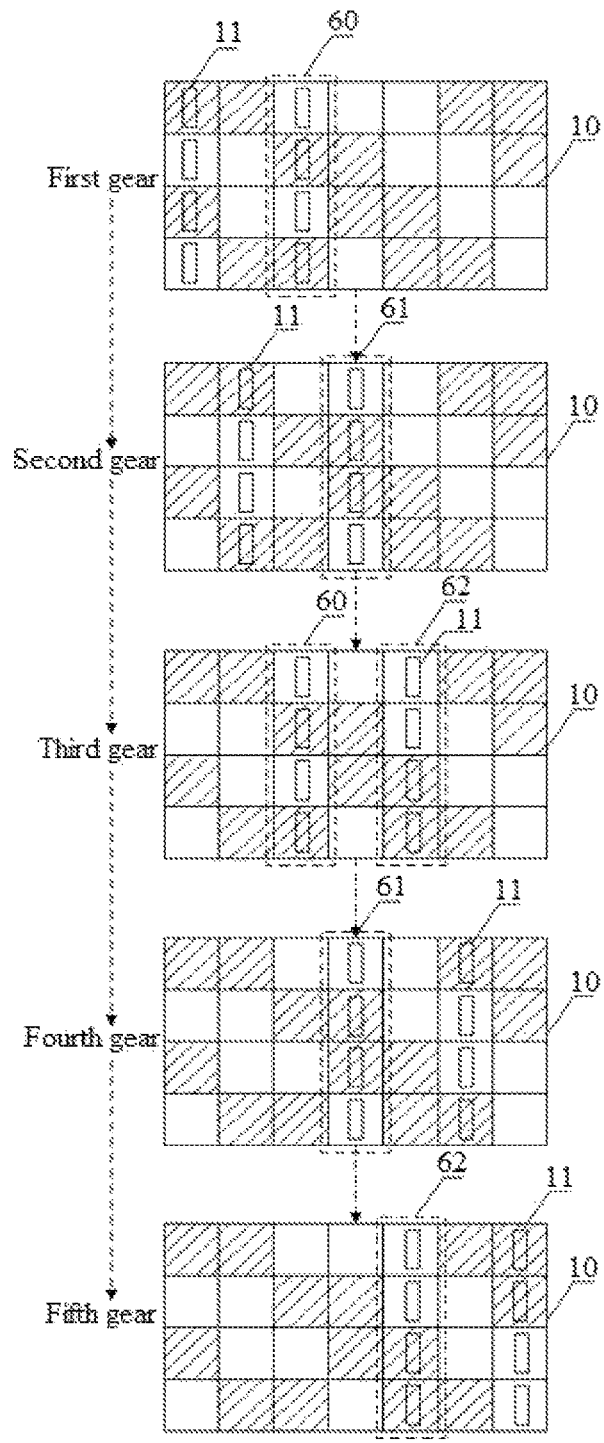
FIG. 6 is a schematic diagram showing a position of sensors of a gearshift device relative to a magnetic plate when the sensors sense coding regions corresponding to respective gears according to another embodiment of the present disclosure.

FIG. 6 is a schematic diagram showing a position of sensors of a gearshift device relative to a magnetic plate when the sensors sense coding regions corresponding to respective gears according to another embodiment of the present disclosure.

Based on the above embodiments, in some implementations, M is 5, the magnetic plate 10 is divided into 7 columns, and each of the coding regions includes 2 columns. The sensors 11 are classified into 2 groups, each group includes at least one sensor 11, and each group of the sensors 11 sense one column of the coding region corresponding to the sensors. The total number of columns of the magnetic plate 10 shared by the coding regions is 3.

The number of gears is 5, the number of the coding regions is 5, the magnetic plate 10 is divided into 7 columns, and each of the coding regions includes 2 columns. Correspondingly, the sensor 11 is classified into 2 groups, the total number of columns of the magnetic plate 10 shared by the coding regions is 3, and the same region covers one column of the magnetic plate 10.

With reference to FIG. 6, a coding region corresponding to a first gear and a coding region corresponding to a third gear share a same region 60 of the magnetic plate 10, and the same region 60 covers a third column of the magnetic plate 10. A coding region corresponding to a second gear and a coding region corresponding to a fourth gear share a same region 61 of the magnetic plate 10, and the same region 61 covers a fourth column of the magnetic plate 10. The coding region corresponding to the third gear and a coding region corresponding to a fifth gear share a same region 62 of the magnetic plate 10, and the same region 62 covers a fifth column of the magnetic plate 10. The third column, the fourth column, and the fifth column of the magnetic plate 10 are shared, and the total number of columns of the magnetic plate 10 shared by the coding regions is 3.

It should be noted that, as shown in FIG. 6, one coding region covers two columns spaced by one column, of the magnetic plate 10, and two groups of the sensors 11 are spaced by one column when the sensors sense the magnetic plate 10. However, the correspondence between the coding region and the columns of the magnetic plate 10 is unnecessary to satisfy the mode shown in the FIG. 6, and two groups of the sensors 11 are unnecessary to be spaced by one column when the sensors sense the magnetic plate 10, as long as the total number of columns of the magnetic plate 10 shared by the coding regions is 3. In addition, which two gears sharing a same region of the magnetic plate 10 and which three columns of the magnetic plate being shared are not limited in the present disclosure. Although the number of the sensors 11 in each group is 4 as shown in FIG. 6, the number of the sensors 11 in each group is unnecessary to be 4, and the numbers of the sensors 11 in different groups are unnecessary to be equal. The number of the sensors 11 in each group and whether the numbers of the sensors 11 in different groups being equal are not limited in the present disclosure.

It should be noted that, shaded regions and non-shaded regions shown in FIG. 6 represent two types of regions having different magnetic field strengths. The sensors 11 output different values when the sensors sense the shaded regions and the non-shaded regions of the magnetic plate 10, so that the sensors 11 output different signals in different coding regions to distinguish different gears. However, the shadow regions and the non-shadow regions are unnecessary to be distributed in the form shown in FIG. 6, as long as the gears can be distinguished based on cooperation of the distribution of the regions and the sensors 11. The specific distribution of the shadow regions and the non-shadow regions is not limited in the present disclosure.

Figure 7:
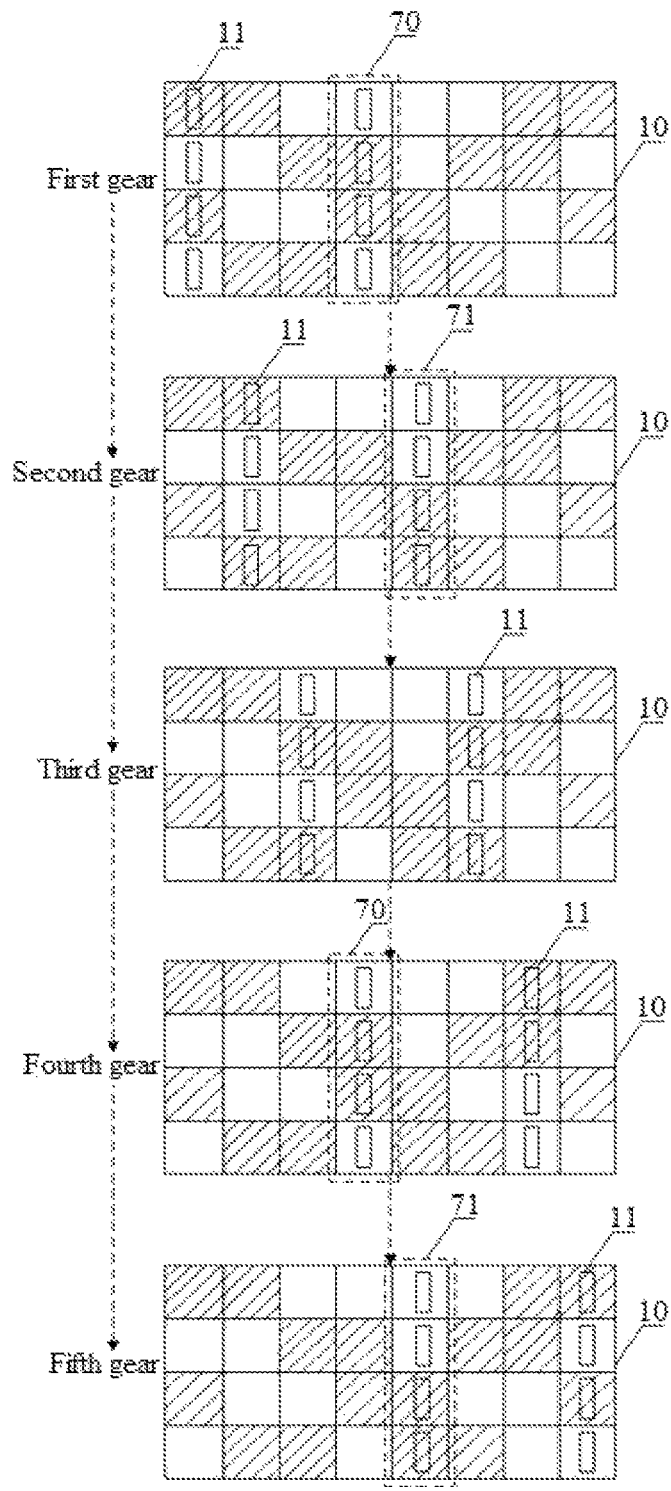
FIG. 7 is a schematic diagram showing a position of sensors of a gearshift device relative to a magnetic plate when the sensors sense coding regions corresponding to respective gears according to another embodiment of the present disclosure.

FIG. 7 is a schematic diagram showing a position of sensors of a gearshift device relative to a magnetic plate when the sensors sense coding regions corresponding to respective gears according to another embodiment of the present disclosure.

Based on the above embodiments, in some implementations, M is 5, the magnetic plate 10 is divided into 8 columns, and each of the coding regions includes 2 columns. The sensors 11 are classified into 2 groups, each group includes at least one sensor 11, and each group of the sensors 11 sense one column of the coding region corresponding to the sensors. The total number of columns of the magnetic plate 10 shared by the coding regions is 2.

The number of gears is 5, the number of the coding regions is 5, the magnetic plate 10 is divided into 8 columns, and each of the coding regions includes 2 columns. Correspondingly, the sensors 11 are classified into 2 groups, the total number of columns of the magnetic plate 10 shared by the coding regions is 2, and the same region covers one column of the magnetic plate 10.

With reference to FIG. 7, a coding region corresponding to a first gear and a coding region corresponding to a fourth gear share a same region 70 of the magnetic plate 10, and the same region 70 covers a fourth column of the magnetic plate 10. A coding region corresponding to a second gear and a coding region corresponding to a fifth gear share a same region 71 of the magnetic plate 10, and the same region 71 covers a fifth column of the magnetic plate 10. The fourth column and the fifth column of the magnetic plate 10 are shared, and the total number of columns of the magnetic plate 10 shared by the coding regions is 2.

It should be noted that, as shown in FIG. 7, one coding region covers two columns, spaced by two columns, of the magnetic plate 10, and two groups of the sensors 11 are spaced by two columns when the sensors sense the magnetic plate 10. However, the correspondence between the coding region and the columns of the magnetic plate 10 is unnecessary to satisfy the mode shown in the FIG. 7, and two groups of the sensors 11 are unnecessary to be spaced by two columns when the sensors sense the magnetic plate 10, as long as the total number of columns of the magnetic plate 10 shared by the coding regions is 2. In addition, which two gears sharing a same region of the magnetic plate 10 and which two columns of the magnetic plate 10 being shared are not limited in the present disclosure. Although the number of the sensors 11 in each group is 4 as shown in FIG. 7, the number of the sensors 11 in each group is unnecessary to be 4, and the numbers of the sensors 11 in different groups are unnecessary to be equal. The number of the sensors 11 in each group and whether the numbers of the sensors 11 in different groups being equal are not limited in the present disclosure.

It should be noted that, shaded regions and non-shaded regions shown in FIG. 7 represent two types of regions having different magnetic field strengths of the magnetic plate. The sensors 11 output different values when the sensors sense the shaded regions and the non-shaded regions of the magnetic plate 10, so that the sensors 11 output different signals in different coding regions to distinguish different gears. However, the shadow regions and the non-shadow regions are unnecessary to be distributed in the form shown in FIG. 7, as long as the gears can be distinguished based on cooperation of the distribution of the regions and the sensors 11. The specific distribution of the shadow regions and the non-shadow regions is not limited in the present disclosure.

Figure 8:
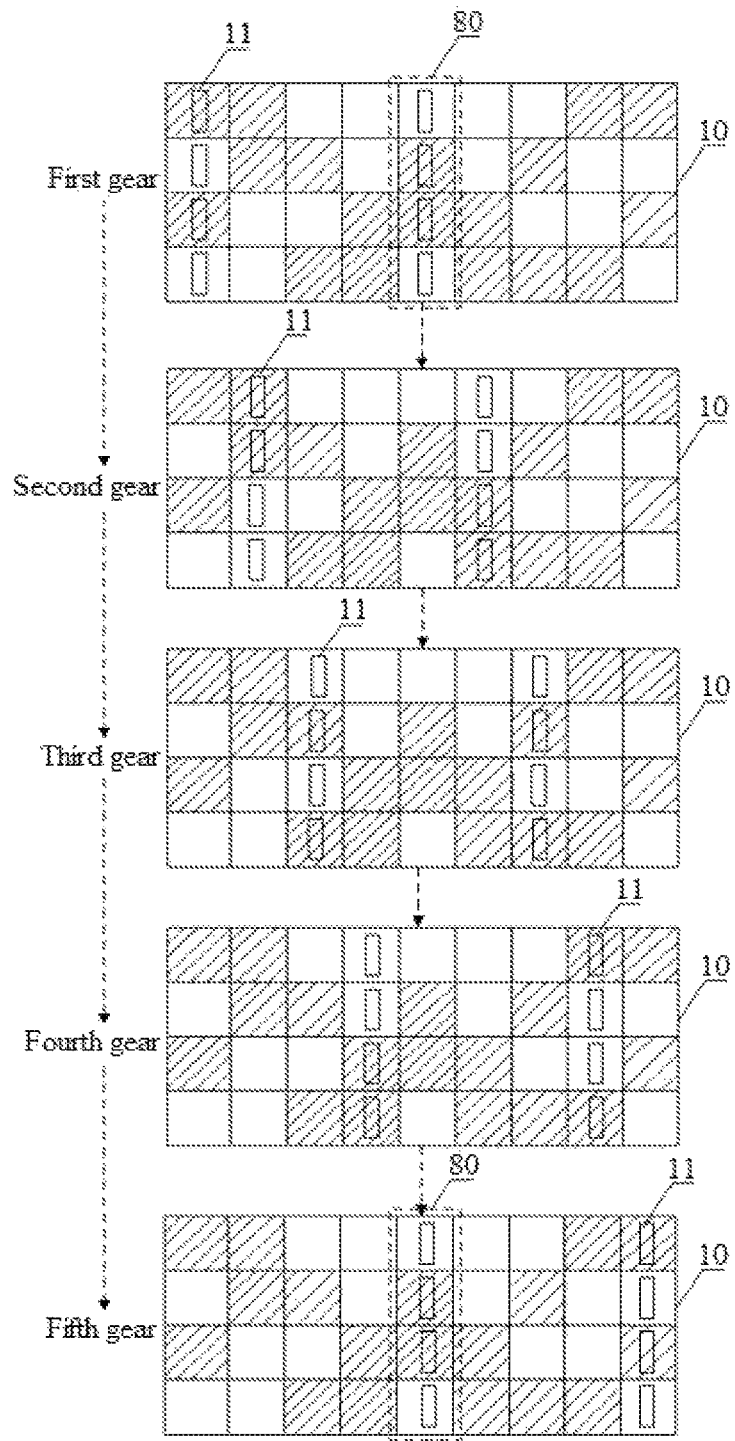
FIG. 8 is a schematic diagram showing a position of sensors of a gearshift device relative to a magnetic plate when the sensors sense coding regions corresponding to respective gears according to another embodiment of the present disclosure.

FIG. 8 is a schematic diagram showing a position of sensors of a gearshift device relative to a magnetic plate when the sensors sense coding regions corresponding to respective gears according to another embodiment of the present disclosure.

Based on the above embodiments, in some implementations, M is 5, the magnetic plate 10 is divided into 9 columns, and each of the coding regions includes 2 columns. The sensors 11 are classified into 2 groups, each group includes at least one sensor 11, and each group of the sensors 11 sense one column of the coding region corresponding to the sensors. The total number of columns of the magnetic plate 10 shared by the coding regions is 1.

The number of gears is 5, the number of the coding regions is 5, the magnetic plate 10 is divided into 9 columns, and each of the coding regions includes 2 columns. Correspondingly, the sensors 11 are classified into 2 groups, the total number of columns of the magnetic plate 10 shared by the coding regions is 1, and the same region covers one column of the magnetic plate 10.

With reference to FIG. 8, a coding region corresponding to a first gear and a coding region corresponding to a fifth gear share a same region 80 of the magnetic plate 10, and the same region 80 covers a fifth column of the magnetic plate 10. The total number of columns of the magnetic plate 10 shared by the coding regions is 1.

It should be noted that, as shown in FIG. 8, one coding region covers two columns, spaced by three columns, of the magnetic plate 10, and two groups of the sensors 11 are spaced by three columns when the sensors sense the magnetic plate 10. However, the correspondence between the coding region and the columns of the magnetic plate 10 is unnecessary to satisfy the mode shown in the FIG. 8, and two groups of the sensors 11 are unnecessary to be spaced by three columns when the sensors sense the magnetic plate 10, as long as the total number of columns of the magnetic plate 10 shared by the coding regions is 1. In addition, which two gears sharing a same region of the magnetic plate 10 and which one column of the magnetic plate 10 being shared are not limited in the present disclosure. Although the number of the sensors 11 in each group is 4 as shown in FIG. 8, the number of the sensors 11 in each group is unnecessary to be 4, and the numbers of the sensors 11 in different groups are unnecessary to be equal. The number of the sensors 11 in each group and whether the numbers of the sensors 11 in different groups being equal are not limited in the present disclosure.

It should be noted that, shaded regions and non-shaded regions shown in FIG. 8 represent two types of regions having different magnetic field strengths. The sensors 11 output different values when the sensors sense the shaded regions and the non-shaded regions of the magnetic plate 10, so that the sensors 11 output different signals in different coding regions to distinguish different gears. However, the shadow regions and the non-shadow regions are unnecessary to be distributed in the form shown in FIG. 8, as long as the gears can be distinguished based on cooperation of the distribution of the regions and the sensors 11. The specific distribution of the shadow regions and the non-shadow regions is not limited in the present disclosure.

Based on the above embodiments, in order to more easily perform coding for each region, as a preferred embodiment, the numbers of the sensors 11 in different groups are equal.

Based on the above embodiments, in order to cause the sensors 11 to better sense the magnetic plate, as a preferred embodiment, the sensors 11 are Hall sensors. The Hall sensor is a sensor made based on Hall Effect, and outputting different voltages based on strength of the magnetic field. The magnetic field distributions of the coding regions on the magnetic plate are different, and thus the sensors 11 output different voltage signals when the sensors sense the coding regions to distinguish different gears.

The embodiments of the gearshift device are described in detail above. Based on the gearshift device described in the above embodiments, a gear coding method corresponding to the gearshift device is provided according to an embodiment of the present disclosure. Since the embodiments of the method and the embodiments of the device correspond to each other, for the embodiments of the method, one may refer to the embodiments of the device. Details are not described herein again.

Figure 9:
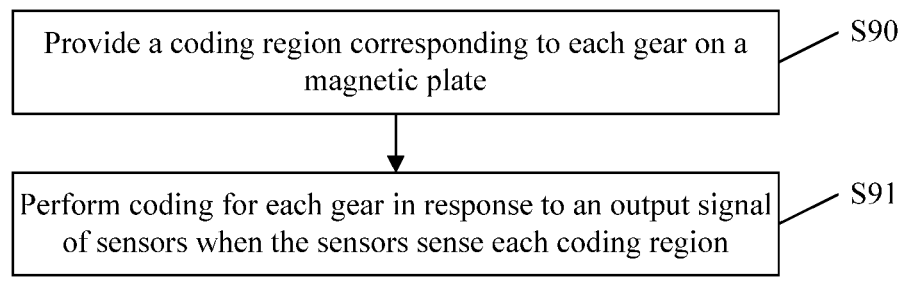
FIG. 9 is a flow chart of a gear coding method according to an embodiment of the present disclosure.

FIG. 9 is a flow chart of a gear coding method according to an embodiment of the present disclosure. As shown in FIG. 9, the method includes the following steps S90 and S91.

In step S90, a coding region corresponding to each gear is provided on a magnetic plate.

In step S91, coding is performed for each gear in response to an output signal of sensors when the sensors sense each coding region.

For different gears, codes corresponding to the output signals of the sensors when the sensors sense same regions of the magnetic plate shared by the coding regions are equal.

Taking the gearshift device shown in FIG. 5 as an example, the gear coding method is described in detail. Each group includes four sensors 11, and coding is performed for each column of the magnetic plate 10. In a case that a code corresponding to a first column of the magnetic plate 10 is, for example, A1A2A3A4, a code corresponding to an output value of the sensors 11 is A1A2A3A4 when the sensors 11 sense the first column. In a case that a code corresponding to a second column of the magnetic plate 10 is, for example, B1B2B3B4, a code corresponding to an output value of the sensors 11 is B1B2B3B4 when the sensors 11 sense the second column. In a case that a code corresponding to a third column of the magnetic plated 10 is, for example, C1C2C3C4, a code corresponding to an output value of the sensors 11 is C1C2C3C4 when the sensors 11 sense the third column. In a case that a code corresponding to a fourth column of the magnetic plate 10 is, for example, D1D2D3D4, a code corresponding to an output value of the sensors 11 is D1D2D3D4 when the sensors 11 sense the fourth column. In a case that a code corresponding to a fifth column of the magnetic plate 10 is, for example, E1E2E3E4, a code corresponding to an output value of the sensors 11 is E1E2E3E4 when the sensors 11 sense the fifth column. In a case that a code corresponding to a sixth column of the magnetic plate 10 is, for example, F1F2F3F4, a code corresponding to an output value of the sensors 11 is F1F2F3F4 when the sensors 11 sense the sixth column.

It should be noted that a code corresponding to each column of the magnetic plate 10 may be other values, and the specific value of the code corresponding to each column is not limited in the present disclosure.

The coding region corresponding to the first gear covers the first column and the second column of the magnetic plate 10. When the sensors 11 sense the coding region corresponding to the first gear, a code corresponding to an output value of the sensors 11 is A1A2A3A4B1B2B3B4, and a code corresponding to the first gear is A1A2A3A4B1B2B3B4.

The coding region corresponding to the second gear covers the second column and the third column of the magnetic plate 10. When the sensors 11 sense the coding region corresponding to the second gear, a code corresponding to an output value of the sensors 11 is B1B2B3B4C1C2C3C4, and a code corresponding to the second gear is B1B2B3B4C1C2C3C4.

The coding region corresponding to the third gear covers the third column and the fourth column of the magnetic plate 10. When the sensors 11 sense the coding region corresponding to the third gear, a code corresponding to an output value of the sensors 11 is C1C2C3C4D1D2D3D4, and a code corresponding to the third gear is C1C2C3C4D1D2D3D4.

The coding region corresponding to the fourth gear covers the fourth column and the fifth column of the magnetic plate 10. When the sensors 11 sense the coding region corresponding to the fourth gear, a code corresponding to an output value of the sensors 11 is D1D2D3D4E1E2E3E4, and a code corresponding to the fourth gear is D1D2D3D4E1E2E3E4.

The coding region corresponding to the fifth gear covers the fifth column and the sixth column of the magnetic plate 10. When the sensors 11 sense the coding region corresponding to the fifth gear, a code corresponding to an output value of the sensors 11 is E1E2E3E4F1F2F3F4, and a code corresponding to the fifth gear is E1E2E3E4F1F2F3F4.

Since the coding regions of the gearshift device share the second, third, fourth, and fifth columns of the magnetic plate 10, last four digits of the code corresponding to the first gear are equal to first four digits of the code corresponding to the second gear, last four digits of the code corresponding to the second gear are equal to first four digits of the code corresponding to the third gear, last four digits of the code corresponding to the third gear are equal to first four digits of the code corresponding to the fourth gear, and last four digits of the code corresponding to the fourth gear are equal to first four digits of the code corresponding to the fifth gear.

Therefore, when the coding is performed for the gears, it is only required to satisfy the above relationship, that is, for different gears, codes corresponding to the output signals of the sensors when the sensors sense same regions of the magnetic plate 10 shared by the coding regions are equal.

For example, in an embodiment, the sensors are preferably Hall sensors. The shaded region in FIG. 5 may represent a region having magnetic field on the magnetic plate, thus a value is outputted by the sensors in the shaded region, and a code corresponding to the shaded region is 1. The non-shaded region may represent a region having no magnetic field on the magnetic plate, thus no value is outputted by the sensors in the non-shaded region, and a code corresponding to the non-shaded region is 0. The code corresponding to the first gear is 10011010, the code corresponding to the second gear is 10100011, the code corresponding to the third gear is 00110101, the code corresponding to the fourth gear is 01011100, and the code corresponding to the fifth gear is 11001001. It can be seen that the last four digits of the code corresponding to the first gear are equal to the first four digits of the code corresponding to the second gear, both of which are 1010; the last four bits of the code corresponding to the second gear are equal to the first four digits of the code corresponding to the third gear, both of which are 0011; the last four digits of the code corresponding to the third gear are equal to the first four digits of the code corresponding to the fourth gear, both of which are 0101; and the last four bits of the code corresponding to the fourth gear are equal to the first four digits of the code corresponding to the fifth gear, both of which are 1100.

Taking the gearshift device shown in FIG. 6 as an example, the gear coding method is described in detail. Each group includes four sensors 11, and coding is performed for each column of the magnetic plate 10. In a case that a code corresponding to a first column of the magnetic plate 10 is, for example, A1A2A3A4, a code corresponding to an output value of the sensors 11 is A1A2A3A4 when the sensors 11 sense the first column. In a case that a code corresponding to a second column of the magnetic plate 10 is, for example, B1B2B3B4, a code corresponding to an output value of the sensors 11 is B1B2B3B4 when the sensors 11 sense the second column. In a case that a code corresponding to a third column of the magnetic plate 10 is, for example, C1C2C3C4, a code corresponding to an output value of the sensors 11 is C1C2C3C4 when the sensors 11 sense the third column. In a case that a code corresponding to a fourth column of the magnetic plate 10 is, for example, D1D2D3D4, a code corresponding to an output value of the sensors 11 is D1D2D3D4 when the sensors 11 sense the fourth column. In a case that a code corresponding to a fifth column of the magnetic plate 10 is, for example, E1E2E3E4, a code corresponding to an output value of the sensors 11 is E1E2E3E4 when the sensors 11 sense the fifth column. In a case that a code corresponding to a sixth column of the magnetic plate 10 is, for example, F1F2F3F4, a code corresponding to an output value of the sensors 11 is F1F2F3F4 when the sensors 11 sense the sixth column. In a case that a code corresponding to a seventh column of the magnetic plate 10 is, for example, G1G2G3G4, a code corresponding to an output value of the sensors 11 is G1G2G3G4 when the sensors 11 sense the seventh column.

It should be noted that a code corresponding to each column of the magnetic plate 10 may be other values, and the specific value of the code corresponding to each column is not limited in the present disclosure.

The coding region corresponding to the first gear covers the first column and the third column of the magnetic plate 10. When the sensors 11 sense the coding region corresponding to the first gear, a code corresponding to an output value of the sensors 11 is A1A2A3A4C1C2C3C4, and a code corresponding to the first gear is A1A2A3A4C1C2C3C4.

The coding region corresponding to the second gear covers the second column and the fourth column of the magnetic plate 10. When the sensors 11 sense the coding region corresponding to the second gear, a code corresponding to an output value of the sensors 11 is B1B2B3B4D1D2D3D4, and a code corresponding to the second gear is B1B2B3B4D1D2D3D4.

The coding region corresponding to the third gear covers the third column and the fifth column of the magnetic plate 10. When the sensors 11 sense the coding region corresponding to the third gear, a code corresponding to an output value of the sensors 11 is C1C2C3C4E1E2E3E4, and a code corresponding to the third gear is C1C2C3C4 E1E2E3E4.

The coding region corresponding to the fourth gear covers the fourth column and the sixth column of the magnetic plate 10. When the sensors 11 sense the coding region corresponding to the fourth gear, a code corresponding to an output value of the sensors 11 is D1D2D3D4F1F2F3F4, and a code corresponding to the fourth gear is D1D2D3D4F1F2F3F4.

The coding region corresponding to the fifth gear covers the fifth column and the seventh column of the magnetic plate 10. When the sensors 11 sense the coding region corresponding to the fifth gear, a code corresponding to an output value of the sensors 11 is E1E2E3E4G1G2G3G4, and a code corresponding to the fifth gear is E1E2E3E4G1G2G3G4.

Since the coding regions of the gearshift device share the third, fourth, and fifth columns of the magnetic plate 10, last four digits of the code corresponding to the first gear are equal to first four digits of the code corresponding to the third gear, last four digits of the code corresponding to the second gear are equal to first four digits of the code corresponding to the fourth gear, and last four digits of the code corresponding to the third gear are equal to first four digits of the code corresponding to the fifth gear.

Therefore, when coding is performed for the gears, it is only required to satisfy the above relationship, that is, for different gears, codes corresponding to the output signals of the sensors when the sensors sense same regions of the magnetic plate 10 shared by the coding regions are equal.

For example, in an embodiment, the sensors are preferably Hall sensors. The shaded region in FIG. 6 may represent a region having magnetic field on the magnetic plate, thus a value is outputted by the sensors in the shaded region, and a code corresponding to the shaded region is 1. The non-shaded region may represent a region having no magnetic field on the magnetic plate, thus no value is outputted by the sensors in the non-shaded region, and a code corresponding to the non-shaded region is 0. The code corresponding to the first gear is 10100101, the code corresponding to the second gear is 10010110, the code corresponding to the third gear is 01010011, the code corresponding to the fourth gear is 01101001, and the code corresponding to the fifth gear is 00111100. It can be seen that the last four digits of the code corresponding to the first gear are equal to the first four digits of the code corresponding to the third gear, both of which are 0101; the last four bits of the code corresponding to the second gear are equal to the first four digits of the code corresponding to the fourth gear, both of which are 0110; and the last four digits of the code corresponding to the third gear are equal to the first four digits of the code corresponding to the fifth gear, both of which are 0011.

Taking the gearshift device shown in FIG. 7 as an example, the gear coding method is described in detail. Each group includes four sensors 11, and coding is performed for each column of the magnetic plate 10. In a case that a code corresponding to a first column of the magnetic plate 10 is, for example, A1A2A3A4, a code corresponding to an output value of the sensors 11 is A1A2A3A4 when the sensors 11 sense the first column. In a case that a code corresponding to a second column of the magnetic plate 10 is, for example, B1B2B3B4, a code corresponding to an output value of the sensors 11 is B1B2B3B4 when the sensors 11 sense the second column. In a case that a code corresponding to a third column of the magnetic plate 10 is, for example, C1C2C3C4, a code corresponding to an output value of the sensors 11 is C1C2C3C4 when the sensors 11 sense the third column. In a case that a code corresponding to a fourth column of the magnetic plate 10 is, for example, D1D2D3D4, a code corresponding to an output value of the sensors 11 is D1D2D3D4 when the sensors 11 sense the fourth column. In a case that a code corresponding to a fifth column of the magnetic plate 10 is, for example, E1E2E3E4, a code corresponding to an output value of the sensors 11 is E1E2E3E4 when the sensors 11 sense the fifth column. In a case a code corresponding to a sixth column of the magnetic plate 10 is, for example, F1F2F3F4, a code corresponding to an output value of the sensors 11 is F1F2F3F4 when the sensors 11 sense the sixth column. In a case that a code corresponding to a seventh column of the magnetic plate 10 is, for example, G1G2G3G4, a code corresponding to an output value of the sensors 11 is G1G2G3G4 when the sensors 11 sense the seventh column. In a case that a code corresponding to an eighth column of the magnetic plate 10 is, for example, H1H2H3H4, a code corresponding to an output value of the sensors 11 is H1H2H3H4 when the sensors 11 sense the eighth column.

It should be noted that a code corresponding to each column of the magnetic plate 10 may be other values, and the specific value of the code corresponding to each column is not limited in the present disclosure.

The coding region corresponding to the first gear covers the first column and the fourth column of the magnetic plate 10. When the sensors 11 sense the coding region corresponding to the first gear, a code corresponding to an output value of the sensors 11 is A1A2A3A4D1D2D3D4, and a code corresponding to the first gear is A1A2A3A4D1D2D3D4.

The coding region corresponding to the second gear covers the second column and the fifth column of the magnetic plate 10. When the sensors 11 sense the coding region corresponding to the second gear, a code corresponding to an output value of the sensors 11 is B1B2B3B4E1E2E3E4, and a code corresponding to the second gear is B1B2B3B4E1E2E3E4.

The coding region corresponding to the third gear covers the third column and the sixth column of the magnetic plate 10. When the sensors 11 sense the coding region corresponding to the third gear, a code corresponding to an output value of the sensors 11 is C1C2C3C4F1F2F3F4, and a code corresponding to the third gear is C1C2C3C4F1F2F3F4.

The coding region corresponding to the fourth gear covers the fourth column and the seventh column of the magnetic plate 10. When the sensors 11 sense the coding region corresponding to the fourth gear, a code corresponding to an output value of the sensors 11 is D1D2D3D4G1G2G3G4, and a code corresponding to the fourth gear is D1D2D3D4G1G2G3G4.

The coding region corresponding to the fifth gear covers the fifth column and the eighth column of the magnetic plate 10. When the sensors 11 sense the coding region corresponding to the fifth gear, a code corresponding to an output value of the sensors 11 is E1E2E3E4H1H2H3H4, and a code corresponding to the fifth gear is E1E2E3E4H1H2H3H4.

Since the coding regions of the gearshift device share the fourth and fifth columns of the magnetic plate 10, last four digits of the code corresponding to the first gear are equal to first four digits of the code corresponding to the fourth gear, and last four digits of the code corresponding to the second gear are equal to first four digits of the code corresponding to the fifth gear.

Therefore, when coding is performed for the gears, it is only required to satisfy the above relationship, that is, for different gears, codes corresponding to the output signals of the sensors when the sensors sense same regions of the magnetic plate shared by the coding regions are equal.

For example, in an embodiment, the sensors are preferably Hall sensors. The shaded region shown in FIG. 7 may represent a region having magnetic field on the magnetic plate, thus a value is outputted by the sensors in the shaded region, and a code corresponding to the shaded region is 1. The non-shaded region may represent a region having no magnetic field on the magnetic plate, thus no value is outputted by the sensors in the non-shaded region, and a code corresponding to the non-shaded region is 0. The code corresponding to the first gear is 10100110, the code corresponding to the second gear is 10010011, the code corresponding to the third gear is 01010101, the code corresponding to the fourth gear is 01101100, and the code corresponding to the fifth gear is 00111010. It can be seen that the last four digits of the code corresponding to the first gear are equal to the first four digits of the code corresponding to the fourth gear, both of which are 0110, and the last four bits of the code corresponding to the second gear are equal to the first four digits of the code corresponding to the fifth gear, both of which are 0011.

Taking the gearshift device shown in FIG. 8 as an example, the gear coding method is described in detail. Each group includes four sensors 11, and coding is performed for each column of the magnetic plate 10. In a case that a code corresponding to a first column of the magnetic plate 10 is, for example, A1A2A3A4, a code corresponding to an output value of the sensors 11 is A1A2A3A4 when the sensors 11 sense the first column. In a case that a code corresponding to a second column of the magnetic plate 10 is, for example, B1B2B3B4, a code corresponding to an output value of the sensors 11 is B1B2B3B4 when the sensors 11 sense the second column. In a case that a code corresponding to a third column of the magnetic plate 10 is, for example, C1C2C3C4, a code corresponding to an output value of the sensors 11 is C1C2C3C4 when the sensors 11 sense the third column. In a case that a code corresponding to a fourth column of the magnetic plate 10 is, for example, D1D2D3D4, a code corresponding to an output value of the sensors 11 is D1D2D3D4 when the sensors 11 sense the fourth column. In a case that a code corresponding to a fifth column of the magnetic plate 10 is, for example, E1E2E3E4, a code corresponding to an output value of the sensors 11 is E1E2E3E4 when the sensors 11 sense the fifth column. In a case that a code corresponding to a sixth column of the magnetic plate 10 is, for example, F1F2F3F4, a code corresponding to an output value of the sensors 11 is F1F2F3F4 when the sensors 11 sense the sixth column. In a case that a code corresponding to a seventh column of the magnetic plate 10 is, for example, G1G2G3G4, a code corresponding to an output value of the sensors 11 is G1G2G3G4 when the sensors 11 sense the seventh column. In a case that a code corresponding to an eighth column of the magnetic plate 10 is, for example, H1H2H3H4, a code corresponding to an output value of the sensors 11 is H1H2H3H4 when the sensors 11 sense the eighth column. In a case that a code corresponding to a ninth column of the magnetic plate 10 is, for example, Ser. No. 11/121,314, a code corresponding to an output value of the sensors 11 is I1I2I3I4 when the sensors 11 sense the ninth column.

It should be noted that a code corresponding to each column of the magnetic plate 10 may be other values, and the specific value of the code corresponding to each column is not limited in the present disclosure.

The coding region corresponding to the first gear covers the first column and the fifth column of the magnetic plate 10. When the sensors 11 sense the coding region corresponding to the first gear, a code corresponding to an output value of the sensors 11 is A1A2A3A4E1E2E3E4, and a code corresponding to the first gear is A1A2A3A4E1E2E3E4.

The coding region corresponding to the second gear covers the second column and the sixth column of the magnetic plate 10. When the sensors 11 sense the coding region corresponding to the second gear, a code corresponding to an output value of the sensors 11 is B1B2B3B4F1F2F3F4, and a code corresponding to the second gear is B1B2B3B4F1F2F3F4.

The coding region corresponding to the third gear covers the third column and the seventh column of the magnetic plate 10. When the sensors 11 sense the coding region corresponding to the third gear, a code corresponding to an output value of the sensors 11 is C1C2C3C4G1G2G3G4, and a code corresponding to the third gear is C1C2C3C4G1G2G3G4.

The coding region corresponding to the fourth gear covers the fourth column and the eighth column of the magnetic plate 10. When the sensors 11 sense the coding region corresponding to the fourth gear, a code corresponding to an output value of the sensors 11 is D1D2D3D4H1H2H3H4, and a code corresponding to the fourth gear is D1D2D3D4H1H2H3H4.

The coding region corresponding to the fifth gear covers the fifth column and the ninth column of the magnetic plate 10. When the sensors 11 sense the coding region corresponding to the fifth gear, a code corresponding to an output value of the sensors 11 is E1E2E3E4I1I2I3I4, and a code corresponding to the fifth gear is E1E2E3E4I1I2I3I4.

Since the coding regions of the gearshift device share the fifth column of the magnetic plate 10, last four digits of the code corresponding to the first gear are equal to first four digits of the code corresponding to the fifth gear.

Therefore, when coding is performed for the gears, it is only required to satisfy the above relationship, that is, for different gears, codes corresponding to the output signals of the sensors when the sensors sense same regions of the magnetic plate 10 shared by the coding regions are equal.

For example, in an embodiment, the sensors are preferably Hall sensors. The shaded region shown in FIG. 8 may represent a region having magnetic field on the magnetic plate, thus a value is outputted by the sensors in the shaded region, and a code corresponding to the shaded region is 1. The non-shaded region may represent a region having no magnetic field on the magnetic plate, thus no value is outputted by the sensors in the non-shaded region, and a code corresponding to the non-shaded region is 0. The code corresponding to the first gear is 10100110, the code corresponding to the second gear is 11000011, the code corresponding to the third gear is 01010101, the code corresponding to the fourth gear is 00111001, and the code corresponding to the fifth gear is 01101010. It can be seen that the last four digits of the code corresponding to the first gear are equal to the first four digits of the code corresponding to the fifth gear, both of which are 0110.

With the gear coding method according to the embodiment, a coding region corresponding to each gear is provided on the magnetic plate, and coding is performed for each gear in response to an output signal of sensors when the sensors sense each coding region. For different gears, codes corresponding to the output signals of the sensors when the sensors sense same regions of the magnetic plate shared by the coding region are equal. It can be seen that, the coding regions are arranged so that the coding regions corresponding to different gears can share the same regions of the magnetic plate, and thus the size of the magnetic plate can be reduced.

A gearshift device and a gear coding method according to the present disclosure are described in detail above. The above embodiments in the specification are described in a progressive manner. Each of the embodiments is mainly focused on describing its differences from other embodiments, and references may be made among these embodiments with respect to the same or similar portions among these embodiments.

It should be noted that various improvements and modifications can be made to the present disclosure by those skilled in the art without departing from the principle of the present disclosure. These improvements and modifications also fall within the protection scope of the claims of the present disclosure.

It should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . ." does not exclude the case that other similar elements may exist in the process, method, article or device.

The invention claimed is:

1. A gearshift device, comprising:
a magnetic plate; and
sensors for sensing the magnetic plate to output a gear signal,
wherein the magnetic plate comprises M coding regions for distinguishing M gears, at least two coding regions of the M coding regions share a same region of the magnetic plate;
and wherein M is a positive integer greater than or equal to 2,
wherein the magnetic plate is divided into N columns, each of the coding regions comprises K columns, the sensors are classified into K groups, each of the k groups comprises at least one of the sensors, each group of the sensors sense one column of the coding region corresponding to the sensors, and the total number of columns of the magnetic plate shared by the coding regions is N−2;
and wherein N is a positive integer greater than or equal to 3, K is a positive integer greater than or equal to 2 and less than N, and the same region comprises at least one column.

2. The gearshift device according to claim 1, wherein for any one of the coding regions, at least one remaining coding region shares the same region of the magnetic plate with the coding region.

3. The gearshift device according to claim 1, wherein the K is 2, and the M is 5.

4. The gearshift device according to claim 2, wherein the M is 5, the magnetic plate is divided into 7 columns, each of the coding regions comprises 2 columns, the sensors are classified into 2 groups, each of the 2 groups comprises at least one of the sensors, each group of the sensors sense one column of the coding region corresponding to the sensors, and the total number of columns of the magnetic plate shared by the coding regions is 3.

5. The gearshift device according to claim 1, wherein the M is 5, the magnetic plate is divided into 8 columns, each of the coding regions comprises 2 columns, the sensors are classified into 2 groups, each of the 2 groups comprises at least one of the sensors, each group of the sensors sense one column of the coding region corresponding to the sensors, and the total number of columns of the magnetic plate shared by the coding regions is 2.

6. The gearshift device according to claim 1, wherein the M is 5, the magnetic plate is divided into 9 columns, each of the coding regions comprises 2 columns, the sensors are classified into 2 groups, each of the 2 groups comprises at least one of the sensors, each group of the sensors sense one column of the coding region corresponding to the sensors, and the total number of columns of the magnetic plate shared by the coding regions is 1.

7. The gearshift device according to claim 1, wherein the numbers of the sensors in different groups are equal.

8. The gearshift device according to claim 1, wherein the sensors are Hall sensors.

9. A gear coding method, performed by a gearshift device, wherein the gearshift device comprises a magnetic plate and sensors for sensing the magnetic plate to output a gear signal, the magnetic plate comprises M coding regions for distinguishing M gears, at least two coding regions of the M coding regions share a same region of the magnetic plate, M is a positive integer greater than or equal to 2; wherein the magnetic plate is divided into N columns, each of the coding regions comprises K columns, the sensors are classified into K groups, each of the k groups comprises at least one of the sensors, each group of the sensors sense one column of the coding region corresponding to the sensors, and the total number of columns of the magnetic plate shared by the coding regions is N−2; wherein N is a positive integer greater than or equal to 3, K is a positive integer greater than or equal to 2 and less than N, and the same region comprises at least one column; and wherein the method comprises:
providing a coding region corresponding to each gear on the magnetic plate, and performing coding for each gear in response to an output signal of the sensors when the sensors sense each of the coding regions, wherein for different gears, codes corresponding to the output signals of the sensors when the sensors sense same regions of the magnetic plate shared by the coding regions are equal.

\* \* \* \* \*